United States Patent [19]
Anderson

[11] Patent Number: 5,690,850
[45] Date of Patent: Nov. 25, 1997

[54] HOCKEY STICK BLADE APPLICATION/REMOVAL TOOL

[76] Inventor: Thomas W. Anderson, 4 Fenlea Cir., Dellwood, Minn. 55110

[21] Appl. No.: 408,914

[22] Filed: Mar. 22, 1995

Related U.S. Application Data

[63] Continuation-in-part of Ser. No. 3,547, Jan. 13, 1993.

[51] Int. Cl.⁶ ............... H05B 3/58; H05B 3/06; A63B 59/00
[52] U.S. Cl. ............... 219/535; 219/520; 273/67 A
[58] Field of Search ............... 273/67 A; 219/535, 219/536, 525, 528, 537, 538, 539, 549, 520, 521

[56] References Cited

U.S. PATENT DOCUMENTS

| | | | |
|---|---|---|---|
| 1,150,426 | 8/1915 | Hadaway | 219/535 |
| 3,393,297 | 7/1968 | Hart | 219/535 |
| 3,638,942 | 2/1972 | Bassett | 273/67 A |
| 3,819,023 | 6/1974 | Burns et al. | 219/535 |
| 3,934,875 | 1/1976 | Easton et al. | 273/67 A |
| 4,937,435 | 6/1990 | Goss et al. | 219/535 |
| 5,151,578 | 9/1992 | Phillips | 219/535 |
| 5,303,916 | 4/1994 | Rodgers | 273/67 A |

Primary Examiner—Teresa J. Walberg
Assistant Examiner—Sam Paik
Attorney, Agent, or Firm—Dorsey & Whitney LLP

[57] ABSTRACT

A hockey stick blade application/removal tool for applying a replacement blade to or removing a replacement blade from the blade receiving end of a hockey stick handle. The tool includes a wrap-around heat panel, an insulative layer surrounding the heat panel and a connection member for connecting the heat panel in such wrap around configuration.

15 Claims, 5 Drawing Sheets

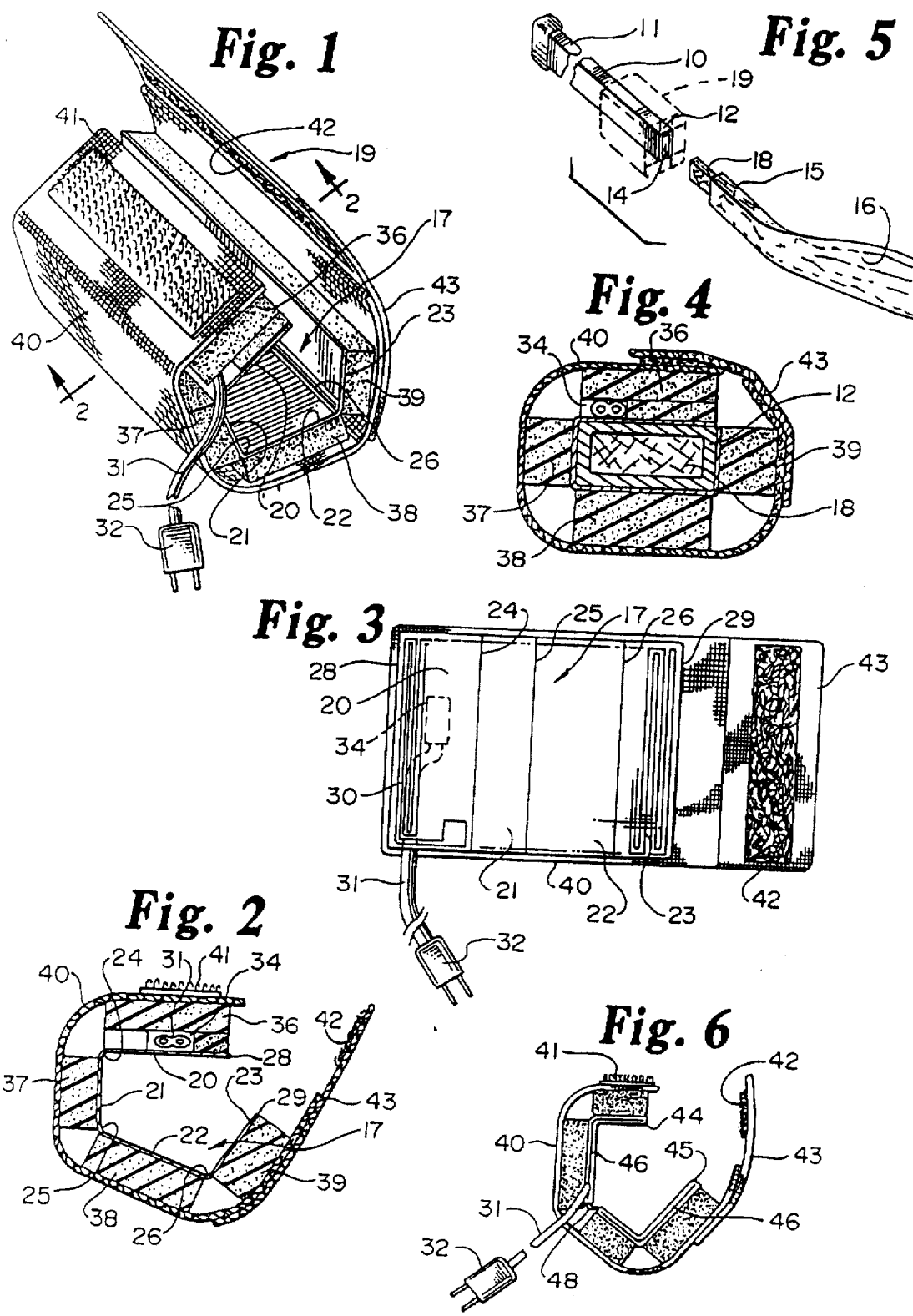

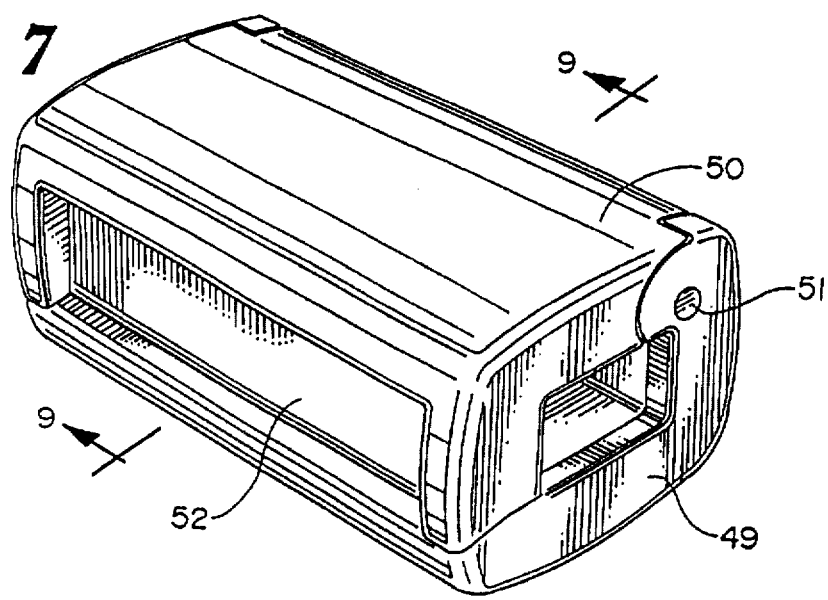
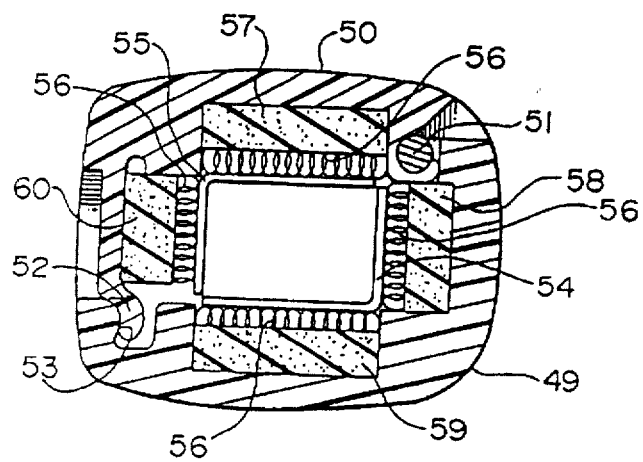
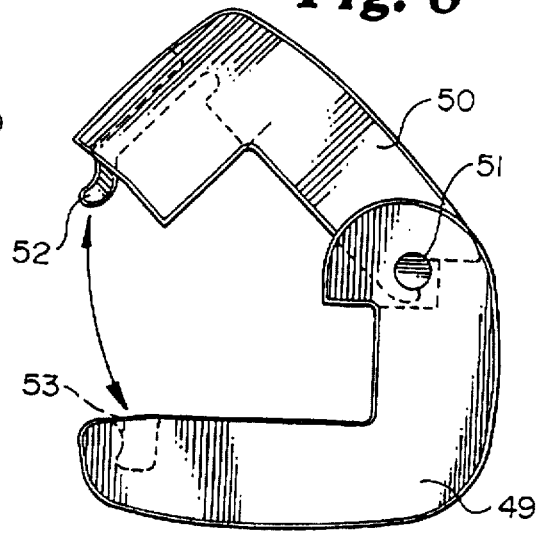

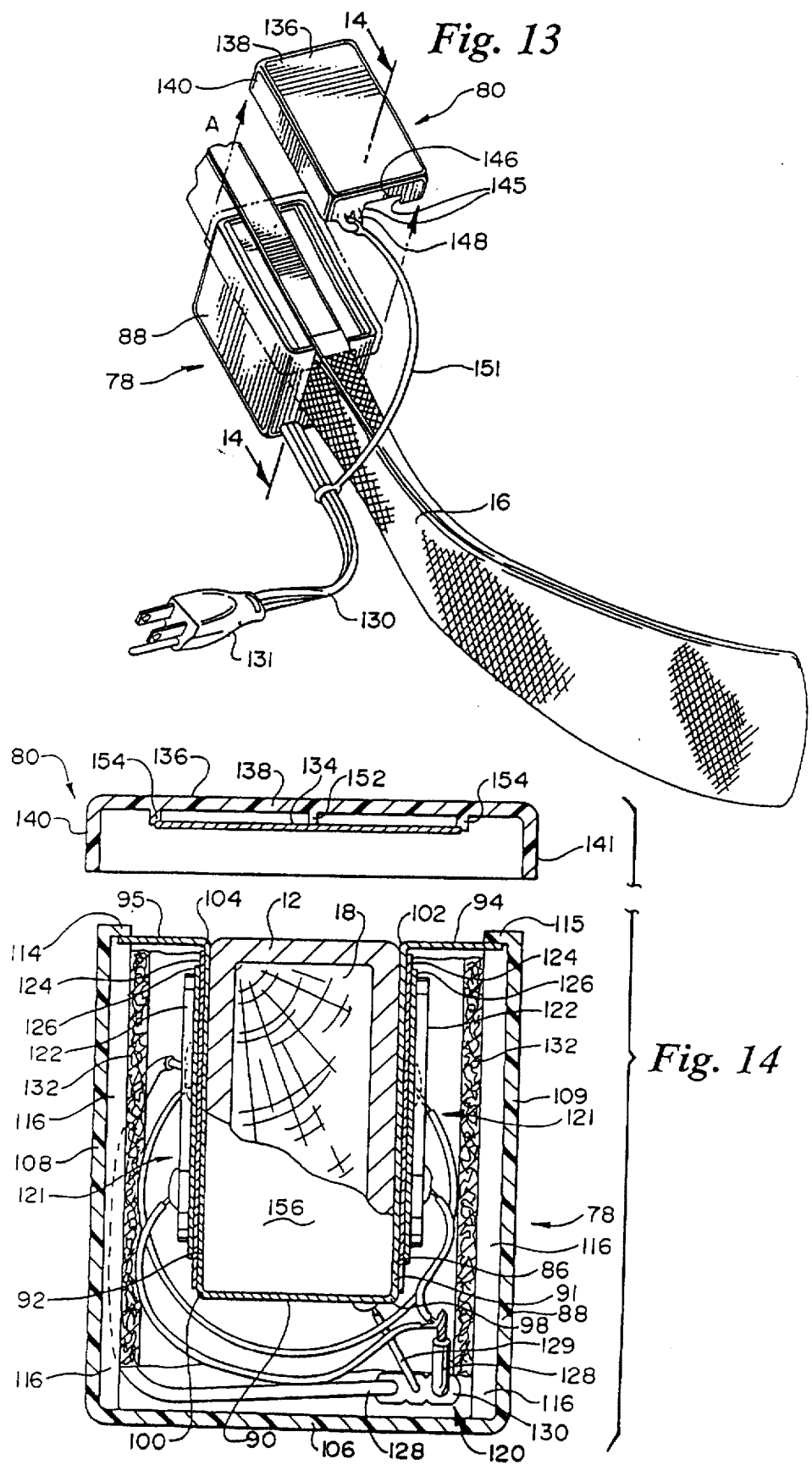

HOCKEY STICK BLADE APPLICATION/REMOVAL TOOL

This is a Continuation-in-Part of application Ser. No. 08/003,547, filed Jan. 13, 1993.

BACKGROUND OF THE INVENTION

1. Field of the Invention

The present invention relates generally to the field of hockey sticks with replaceable blades and the like and more particularly, to a tool facilitating the application and/or removal of a replaceable hockey stick blade from a hockey stick shaft.

2. Description of the Prior Art

Hockey sticks in general, and particularly ice hockey sticks, have experienced dramatic changes throughout the years. As a result, ice hockey sticks have changed from a plain wooden stick having a straight blade and handle to a significantly improved stick having a curved blade and being reinforced with fiberglass or the like.

Significant evolution has also occurred in the construction of the stick itself. Initially, handle and blade portions were constructed of wood and were joined with one another through various processes to form a single, integral unit. As technology has developed, metal handles, and particularly aluminum handles or shafts, have been introduced. Such handles or shafts include an elongated handle portion constructed of a tubular section of aluminum or other lightweight metal with a blade receiving end for connection with a replaceable blade.

A more recent development of ice hockey sticks has included the introduction of plastic or composite shafts. Like aluminum shafts, the plastic or composite shafts are elongated and generally hollow and are secured to a replaceable blade in a similar manner.

Replaceable blades for aluminum, plastic or composite handles are usually purchased separately from the handles and include a blade portion and a shaft connecting end designed for connection through various hot melt adhesive means or the like to the handle. When a blade breaks or wears out, such blade is replaced with a new one. Adhesives commonly used to connect the replacement blade with the handle include what are commonly referred to as hot melt adhesives which melt or soften with the application of heat above a certain temperature. Such temperatures for these adhesives are commonly in the range of about 170°–230° F. (77°–110° C.).

To replace a broken or worn out blade, heat is applied to the bottom or blade receiving end of the aluminum, plastic or composite handle. Currently, this is done with a blow torch or a heat gun. As the temperature of the blade receiving end is elevated, the adhesive melts, thus permitting the blade to be removed. While the shaft end is still hot, the tenon or connecting end of the replacement blade is inserted into the shaft. Thereafter, the heat source is removed and the adhesive is allowed to cool and harden, thereby securing the blade to the shaft.

Although blow torches and air guns provide sufficient heat for the blade replacement process, there are several disadvantages. First, blow torches can be extremely dangerous since they involve the use of a pressurized container of liquid propane or the like and heat is generated with an open flame which is applied directly to the lower end of the hockey stick shaft. This is of particular concern when it is considered that many of the blades are replaced by the hockey playing kids themselves, without adult supervision.

Secondly, both torch apparatus and heat guns tend to be relatively large and cumbersome and heat guns tend to be expensive.

Thirdly, use of a torch with an open flame is particularly undesirable when used in connection with a composite or plastic shaft. Unlike aluminum shafts, a plastic or composite shaft is a potentially combustible material which, if excessively heated with a torch, can burn. Further, most plastic or composite shafts are constructed of resin materials which, if heated above the glass transition temperature of such resin, can adversely affect the strength of the material. In most plastic or composite sticks, this glass transition temperature is relatively low and can be easily exceeded when heating with a blow torch.

Accordingly, there is a need in the art for a hockey stick blade application/removal tool which can be safely used in connection with both aluminum and plastic or composite shafts, which is cost effective and which overcomes the other limitations and disadvantages associated with methods currently used in the prior art.

SUMMARY OF THE INVENTION

The present invention relates generally to a hockey stick blade application/removal tool for applying a replacement blade to, or removing a replacement blade from, the blade receiving end of a hockey stick shaft. More specifically, the tool of the present invention includes a heat blanket or panel having a plurality of heat panel portions which are adapted to be wrapped around the blade receiving end of the hockey stick shaft for heating such end to a predetermined elevated temperature. An insulating protective layer is disposed outside of and surrounds the heat panel for protecting the user when the tool is being used. Such layer also functions to direct heat toward the surrounded blade receiving end of the shaft and to insure heat transfer contact between the heat panel and the shaft. In the preferred embodiment, the tool also embodies an outer shell surrounding the insulating protective layer and connection means for maintaining the heat panel portions in a position wrapped around the blade receiving end of the shaft. Thermostatic means are also provided for controlling the heat generated by the heat panels and a power cord is provided to provide electric power to activate the heat panel.

It is contemplated that the tool of the present invention can embody several forms of a heat panel and heat panel portions. One embodiment contemplates a heat panel with a printed circuit heat generating element applied to one surface of a heat panel substrate or sandwiched between portions of a pair of heat panel substrates. Further embodiments contemplate heat elements embedded within the heat panel or heat panel portions or separate heating elements positioned adjacent to a conductive heat panel or heat panel portions. In the latter embodiment, the heat panel portions are heated by the heating elements and then conduct the heat to the sides of the blade receiving end of the shaft.

The preferred embodiment of the present invention contemplates a single heat panel with a plurality of heat panel portions. Preferably, the tool includes a heat portion associated with each of the sides of the blade receiving end of the shaft. In such embodiment, adjacent panel portions are hingedly connected to one another so that they can be wrapped around the shaft.

The thermostat means provide temperature control for the tool. With such means a desired maximum temperature can be maintained, thereby facilitating use of the device not only with aluminum shafts, but also with plastic or composite shafts, without danger of overheating.

3

Accordingly, it is an object of the present invention to provide a hockey stick blade application/removal tool which is safer than currently existing devices.

A further object of the present invention is to provide a hockey stick blade application/removal tool which can be used both with aluminum and plastic or composite shafts without danger of overheating.

A further object of the present invention is to provide a hockey stick blade application/removal tool which includes a heat panel having a plurality of wraparound heat panel portions.

A still further object of the present invention is to provide a hockey stick blade application/removal tool which is compact, safe and cost effective.

These and other objects of the present invention will become apparent with reference to the drawings, the description of the preferred embodiment and the appended claims.

DESCRIPTION OF THE DRAWINGS

FIG. 1 is a perspective view of the preferred embodiment of the application/removal tool of the present invention.

FIG. 2 is a view, partially in section, of the preferred embodiment of the application/removal tool as viewed along the section line 2—2 of FIG. 1.

FIG. 3 is an elevational plan view of the tool of FIG. 1 with the tool opened up to show the heat panel and heat panel portions.

FIG. 4 is a view, partially in section, showing the tool of the present invention wrapped around the blade receiving end of a shaft.

FIG. 5 is a perspective view of a hockey stick shaft and replacement blade with the tool of the present invention illustrated in phantom.

FIG. 6 is an elevational end view showing an alternate heat panel assembly for the tool of the present invention.

FIG. 7 is a perspective view of a further alternate embodiment of a blade application/removal tool in accordance with the present invention.

FIG. 8 is an elevational end view of the tool of FIG. 7 in an open position.

FIG. 9 is a view, partially in section, as viewed along the section lines 9—9 of FIG. 7.

FIG. 13 is a perspective view of a further alternate embodiment shown in use relative to the blade receiving end of a hockey stick shaft with the top section removed from the bottom section to enable the user to place the blade receiving end of the shaft into the bottom section and the top section in contract with the bottom section shown in phantom.

FIG. 14 is a view, partially in section and with portions of the hockey stick removed, as viewed along the section lines 14—14 of FIG. 13.

DESCRIPTION OF THE PREFERRED EMBODIMENT

Figure 10:
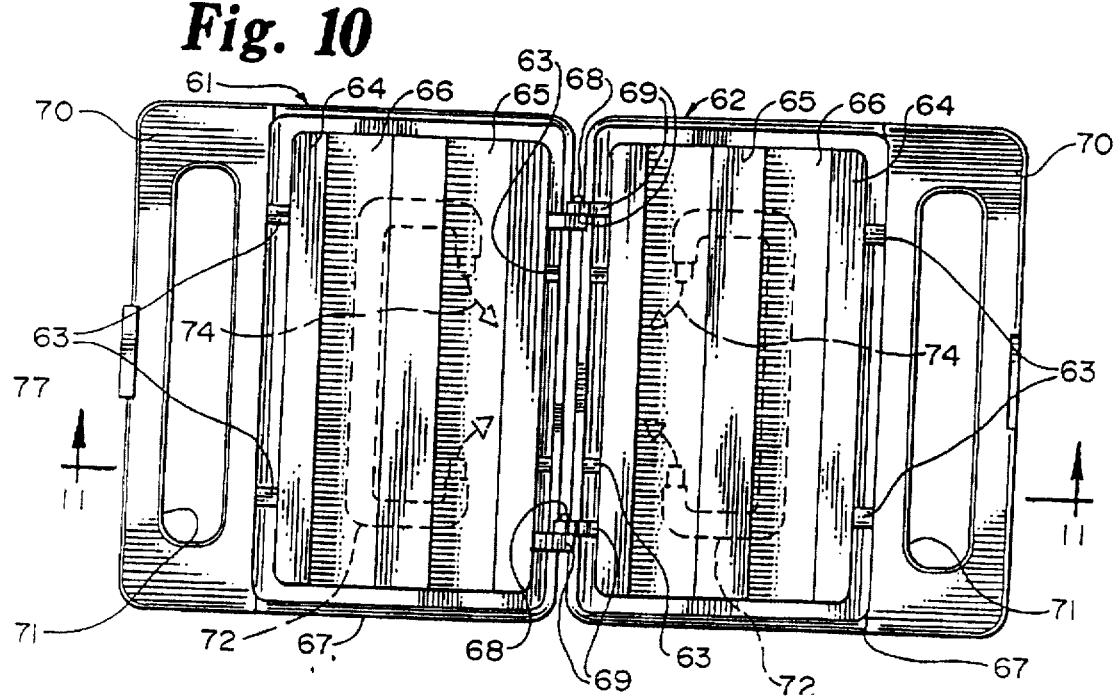
FIG. 10 is a top elevational view of a further alternate embodiment of a blade application/removal tool in accordance with the present invention with such tool in an open position.

The present invention relates generally to a hockey stick blade application/removal tool which is adapted for use in applying a replacement blade to, or removing a replacement blade from, the blade receiving end of a hockey stick shaft. Reference is first made to FIG. 5 showing a hockey stick shaft and replacement blade of the type with which the tool of the present invention is intended for use. As illustrated in FIG. 5, the hockey stick includes an elongated handle or shaft 10 with an upper handle end 11 and a lower blade receiving end 12. The shaft 10 is a generally tubular, four sided structure having top and bottom edges joined by a pair of sides. The shaft 10 which is hollow throughout and includes a blade receiving opening 14 at the blade receiving end 12. The shafts 10 are normally constructed of aluminum or other lightweight metal, or more recently, plastic or composite materials.

The replacement blade 15 is provided with a blade portion 16 and a connecting end or tenon 18. The tenon 18 is adapted for insertion into the opening 14 at the blade receiving end 12 and thus has outer dimensions approximating, or preferably slightly smaller than, the inner dimensions of the opening 14. Preferably, a hot melt or other heat sensitive adhesive is applied to the tenon 18 and/or the interior of the opening 14 for the purpose of securing the replacement blade 15 to the shaft 10.

The preferred embodiment of the blade application/removal tool of the present invention is illustrated best in FIGS. 1–4. Specifically, the tool 19 includes a heat blanket or panel 17 comprising a plurality of heat panel portions 20, 21, 22 and 23. The heat panel portions are adapted for heat transfer contact with the top and bottom edges and sides of the blade receiving end 12 (FIG. 5). As illustrated best in FIGS. 1 and 3, the heat panel 17 has a generally rectangular configuration and is comprised of the generally rectangular heat panel portions 20–23. Each of the portions has dimensions suitable for wrapping around the blade receiving end 12. Specifically, the panel portions 20–23 have width dimensions which correspond approximately to the respective width of the top, bottom and sides of the blade receiving end 12 of the shaft. Thus, the panel portions 20 and 22 have widths which correspond respectively to the top and bottom edges of the blade receiving end 12, while the panel portions 21 and 23 have widths which correspond respectively to the sides of the blade receiving end 12. Preferably the length of each of the panel portions 20–23 is sufficiently long so that when applied to the blade receiving end 12, the entire portion of the blade receiving end which receives the tenon 18 will be wrapped within the tool 19. Thus, the length of each of the panels 20–23 should preferably be at least as long as the tenon 18.

The heat panel portions 20–23 include central portions 21 and 22 and outer portions 20 and 23. The central panel portions 21 and 22 are joined to one another along the common edge 25 and are also respectively joined to the outer heat panel portions 20 and 23 along the common edges 24 and 26, respectively. The outer panel portions 20 and 23 include outer, free edges 28 and 29. The edges 24, 25 and 26 function as hinge means, thereby permitting the heat panel 17 to be bent along the lines 24, 25 and 26 so that the individual panel portions 20–23 can contact and conform to the top, bottom and sides of the blade receiving end 12.

As illustrated best in FIG. 3, the heat panel 17 and thus each of the panel portions 20–23 is provided with a continuous heating element in the form of a printed circuit 30. Preferably, the printed circuit 30 is sandwiched between layers or substrates of a material intended for direct heat transfer contact with the top, bottom and sides of the blade receiving end 12. In the preferred embodiment, such material is a material known by and sold under the trademark Kapton. However, various other materials will function as well. As will be discussed below with respect to operation of the tool, the heating element 30 functions to generate heat by connection with a source of electrical power.

An electrical power cord 31 having a receptacle end 32 is connected with the heat panel 17 and is shown as extending from the heat panel portion 20. A thermostat 34 is provided in the electrical circuit 30 and is adjacent to a surface of the panel portion 20. In the preferred embodiment, the thermostat 34 is secured to an outer surface of the panel portion 20 and is connected in series between the power cord 31 and the printed circuit 30. The thermostat 34 functions to maintain the temperature of the heat panel 17 at a preselected and desirable level. In the preferred embodiment, this temperature level is within a range of about 250°–340° F. (121°–171° C.) and most preferably about 290° F. (143° C.). In the preferred embodiment, the thermostat switch is a bi-metal thermostat switch (Portage type C) mounted to the outer surface of the heater.

Connected with the outer surface of each of the heat panel portions 20–23 is an insulating and protective layer comprising the insulating portions 36, 37, 38 and 39. As shown, the portions 36–39 are separate from one another and are individually associated with the outer surfaces of the panel portions 20–23, respectively. The insulating portions 36–39 extend substantially the entire width and substantially the entire length of their respective panel portions 20–23. Preferably, the portions 36–39 are relatively thick compared to the panel portions 20–23 and are constructed of a generally compressible material having a generally spongy characteristic. The preferred material is an insulating Neoprene material having a compressibility factor of about 4 to 5 pound density (BOYAD-B-42N Neoprene foam). It is contemplated, however, that other materials with similar properties can also be used. Such materials should, however, preferably be insulative and spongy or compressible. The insulative portions 36–39 provide several functions. First, they function to insulate the heating panel 17 from the user. Thus, the portions should be thick enough or be insulative enough to accomplish this function. Secondly, the portions 36–39 function to dissipate heat and direct it inwardly toward the blade receiving end 12 (FIG. 4) when the tool is in use. Thirdly, the compressibility of the portions 36–39 insures that the panel portions 20–23 are maintained in heat transfer contact with the top, bottom and sides of the shaft, regardless of its particular size, shape, etc.

An outer shell 40 surrounds the portions 36–39. This outer shell 40 includes an extension 43 and is provided with connection means in the form of the mating Velcro surface portions 41 and 42. In the preferred embodiment, the outer shell 40 is constructed from a relatively soft, fabric type material such as Nylon. Preferably the inner surface of the shell 40 is secured to the outer surfaces of one or more of the insulative portions 36–39 by an appropriate adhesive.

Use of the tool of the embodiment of FIGS. 1–5 can best be understood with reference to such figures, and particularly to FIG. 4. First, the tool is wrapped around the blade receiving end 12 (FIG. 5) of a hockey stick shaft. Unless the shaft is new, the shaft will normally have a blade which needs replacement. The tool is wrapped so that the heat panel portions 20–23 contact corresponding top, bottom and side surfaces of the end 12. The outer shell 40 is then pulled tight and the mating Velcro surfaces 41 and 42 are attached to one another as shown in FIG. 4. The plug 32 is then inserted into electrical outlet, to activate the heating element 30. This causes the panel portions 20–23 to heat the end 12. When the desired temperature is reached, which can be identified by an indicating light or the like, the hot melt adhesive has sufficiently softened or liquified to permit removal or insertion of the tenon 18 of the replacement blade 15 into the open end 14. As described above, the thermostat 34 (FIGS. 2 and 3) prevent the tool from overheating and maintains the temperature at a level which is sufficient to soften or liquify the hot melt adhesive, but which is well below the glass transition temperature of any plastic or composite shaft with which the tool may be used. After the blade 15 has been inserted and/or removed, the plug 32 is removed from the outlet and the tool removed from the blade receiving end 12. The shaft and applied blade are then allowed to cool.

FIG. 6 illustrates an alternate structure of the heat panel means. Specifically, the heat panel means of FIG. 6 comprises a pair of separate heat panel portions 44 and 45 positioned adjacent to one another along an adjacent edge. Each of the panel portions 44 and 45 comprises a generally right angled configuration having a pair of legs with one leg corresponding in size and configuration to the top or bottom of the blade receiving end 12 and the other conforming in size and configuration to one of the sides of the blade receiving end 12. In the embodiment of FIG. 6, a heat generating element 46 is embedded within each of the panel portions 44 and 45 with electrical connection 48 provided between such heat elements. The portions 44 and 45 are preferably constructed from a heat conductive material such as silicon.

FIGS. 7, 8 and 9 represent a further embodiment incorporating the present invention. Specifically, instead of the generally soft and flexible fabric type outer shell 40 of FIGS. 1–6, the embodiment of FIGS. 7–9 comprises a generally rigid outer shell which is designed for movement between an open position and a closed position.

More specifically, the embodiment of FIGS. 7–9 includes a pair of outer shell or housing portions 49 and 50 which are pivotable with respect to each other about the pivot point 51. As illustrated, the portions 49 and 50 are pivotable between a closed position illustrated in FIG. 7 and an open position illustrated in FIG. 8. Connection means for connecting the portions 49 and 50 are provided in the form of a latch member 52 in the upper portion 50 and a latch receiving cavity 53 in the lower portion 49.

As illustrated best in FIG. 9, each of the portions 49 and 50 is provided with heat panel portions 54 and 55, respectively. These heat panel portions 54 and 55 are generally configured to conform to corresponding outer top, bottom and side surfaces of the blade receiving end 12. Each of the portions 49 and 50 is also provided with heat element means 56 for heating the panel portions 54 and 55. Insulative protective layers 57, 58, 59 and 60 are positioned between the heat elements 56 and the outer surface of the housing portions 49 and 50, respectively. The embodiment of FIGS. 7, 8 and 9 may also be provided with heat panel and heat panel portions similar to those of FIGS. 1–6.

Figure 11:
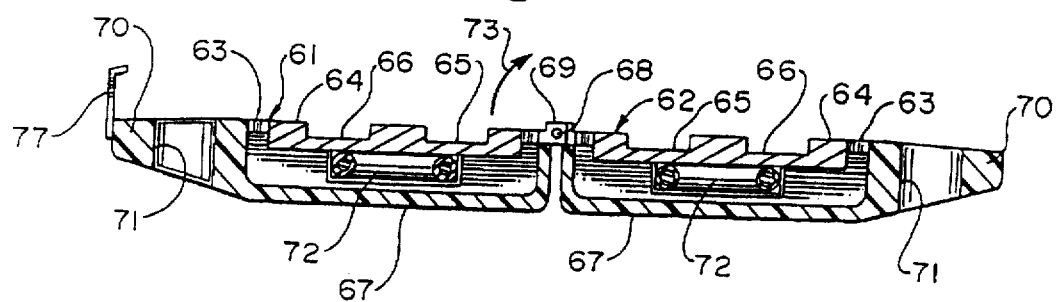
FIG. 11 is a view, partially in section, as viewed along the section lines 11—11 of FIG. 10.
Figure 12:
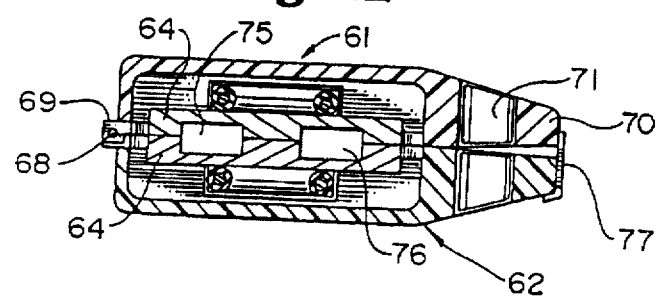
FIG. 12 is a view, partially in section, similar to FIG. 11 except showing the tool in a closed position.

FIGS. 10, 11 and 12 represent a still further embodiment incorporating the present invention. This embodiment is similar to the embodiment of FIGS. 7–9 in that it is provided with a generally rigid outer shell rather than the soft and flexible fabric shell of FIGS. 1–6. As illustrated, the embodiment of FIGS. 10–12 includes a pair of sections 61 and 62 which are pivotable relative to one another about the pivot pin 68 in the direction of the arrow 73 (FIG. 11). In the preferred embodiment, the sections 61 and 62 comprise top and bottom sections respectively. Each of the sections 61 and 62 includes an outer plastic shell or shroud 67 and a supported heat plate 64. Each of the heat plates 64 is supported within the shell 67 and each is provided with a plurality of insulating cushions or spacers 63 for the purpose of maintaining proper spaced relationship between the heating plates 64 and the inner surface of the shell 67. Each of the plates 64 is further provided with a pair of recessed portions 65 and 66 which correspond respectively with recessed portions 65 and 66 of the other section. When the sections 61 and 62 are closed as shown in FIG. 12, the recessed portions 65 and 66 form heating cavities 75 and 76 for the blade receiving ends of a pair of hockey stick shafts. The inwardly positioned rearward edges of the plates 64 are provided with pivot brackets 69 to facilitate pivotal movement of the plates 64 and thus the sections 61 and 62 relative to the common pivot pin 68.

Associated with each of the heat plates 64 is a heat element 72 having a pair of electrical contact ends 74 for appropriate connection with a source of electrical power. Each heat element 72 functions to heat its respective heat plate 64. Although a variety of heat elements 72 can be utilized, the heat elements 72 utilized in the embodiment of FIGS. 10-12 is an electrical heat tube of the type available in the art. The heat elements may also comprise various forms of heat coils. Associated with the heat elements 72 are thermostat means for maintaining temperature control. Preferably the heat plates are constructed of cast aluminum to facilitate the conductive dissipation of heat from the heat elements 72 throughout the entire plates 64.

The protective shell or shroud 67 is spaced from the heating element and the heat plate 64 and is provided with a forwardly extending handle means 70 having a handle opening 71. The handle 70 is provided with an appropriate latch means 77 for maintaining the to position (FIG. 12) when desired.

Figure 15:
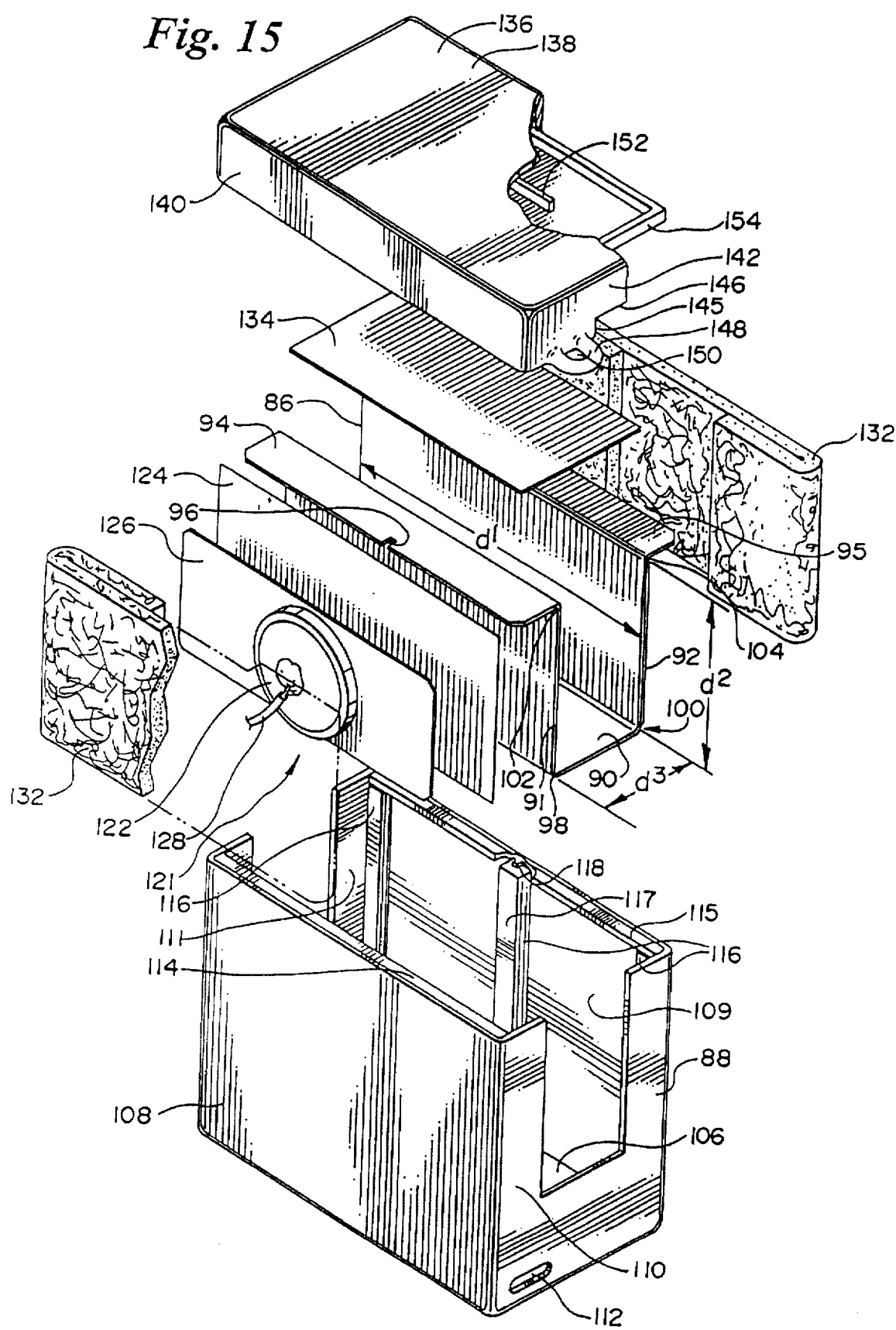
FIG. 15 is an exploded view of the alternate embodiment shown in FIG. 13 with portions broken away.

FIGS. 13, 14 and 15 represent yet another embodiment incorporating the present invention. This embodiment is similar to the embodiment of FIGS. 7-12 in that it is provided with a generally rigid outer shell rather than the soft and flexible fabric shell of FIGS. 1-6. As illustrated, the embodiment of FIGS. 13-15 includes a pair of sections 78 and 80 which are removably attached to one another. In the preferred embodiment, the sections 78 and 80 comprise bottom and top sections respectively. As discussed below, each of the sections 78 and 80 includes an outer plastic shell or housing and a heat plate supported within the shell.

The bottom section 78 includes a generally U-shaped heat plate 86 supported by a bottom housing or base 88. The U-shaped heat plate 86 includes a bottom and two side heat plate portions, 90, 91 and 92, respectively. The U-shaped heat plate 86 further includes two support and heat transfer portions 94, 95, extending outwardly at right angles to the side portions 91 and 92. Each support portion 94, 95, has a notch 96, 97, respectively, for accommodating the webs 118 as described below. The bottom panel portion 90 is joined to the side panel portion 91 along a common edge 98 and joined to side panel portion 92 along a common edge 100. The support portion 94 is joined to the side panel portion 91 along a common edge 102 and the support portion 95 is joined to the side panel portion 92 along a common edge 104.

As best seen in FIGS. 14 and 15, the preferred structure of the base 88 includes a bottom wall 106, a pair of side walls 108 and 109, and a pair of end walls 110 and 111, each having a U-shaped slot corresponding to the shape of the U-shaped heat plate 86. End wall 110 also has a electric cord aperture 112. Each side 108, 109, is provided with an edge cap 114, 115, respectively, along its top edge and a plurality of side posts 116 for providing additional strength. Three side posts 116 are attached to the inner surface of each side wall 108, 109. As illustrated in FIG. 15, one side post 116 is positioned adjacent each end wall 110, 111 and the third or center side post 117 is positioned centrally between the end walls 110, 111. The top edge caps 114, 115 are attached to the top of the side walls 108, 109, respectively, and are adjacent to, but not in contact with, the top of the side posts 116. As seen in FIG. 14, the support portions 94, 95, are embedded in the gap between the side posts 116 and the edge caps 114, 115, thereby securing and supporting the heat plate 86 within the base 88. As shown in FIG. 15, a web 118 is connected between the top of each center side post 117 and edge cap 114, 115 to provide additional strength to the structure.

Associated with the heat plate 86 is a heating assembly 120 including a heating unit 121 connected with each of the side portions 91 and 92. Each heating unit includes a thermistor or self-limiting heater 122, a thermally conductive sheet of electric insulative material 124, a bus bar 126, a pair of electrical wires 128 and a grounding wire 129 ensheathed in an electric cord 130 having a electric plug 131. As shown best in FIGS. 14 and 15 a sheet of thermally conductive, but electrically insulative, material 124 is attached to each side portion 91, 92. The length and width of the material 124 is substantially the same as the side portion 91 or 92 to which it is attached. A bus bar 126 is attached to each sheet of material 124. The width and length of the bus bar 126 is slightly less than the width and length of the element 124. Attached to each bus bar 126 is a thermistor 122. Electrical wires 128 are soldered to the thermistor 122 and the bus bar 124 to create an electrical circuit. The ground wire 129 is soldered to the bottom portion 90 of the heat plate 86 to terminate the flow of electricity in the event the electric insulation 124 is breached by the electrical current. A batt of thermal insulation 132 fills the area between each side wall 108, 109, and the heating unit attached to the corresponding side heat plate side portions 91, 92.

The top section 80 includes a flat heat plate 134 supported by the cover or lid 136. The cover 136 includes a top portion 138, a pair of side portions 140, 141, and a pair of end portions 142, 143. Each end portion includes a U-shaped slot defined by two side edges 145, and a top edge 146. The cover further includes a semicircular shaped tab 148 having an aperture 150 extending outwardly from end portion 142 to receive one end of a tether 151. The other end of the tether 151 may be connected to the electric cord 130. A linear center plate shim 152 and a rectangular periphery plate shim 154 project outwardly from the bottom of the top portion 138 to support the heat plate 134. Specifically, the flat heat plate 134 is attached to the center plate shim 152 and the periphery plate shim 154 such that when the top section 80 is positioned on the bottom section 78, the outer peripheral edges of the plate 134 engage and are supported by the top portions 94, 95.

When the plate 134 is engaged and supported by the top portions 94, 95, the plates 86 and 134 form a heat cavity 156. The heat cavity is approximately 2 to 3 ½ inches long as depicted by dimension $d^1$ in FIG. 15; ⅝ to 1 inch wide as depicted by dimension $d^2$ and ¾ to 1¼ inches high as depicted by dimension $d^3$. The heat cavity 156 may be any dimension that radiates sufficient heat to soften or melt the hot melt adhesive at the blade receiving end of the stick. Preferably the heat cavity corresponds to the top, bottom and side edges of the shaft 10 so that when in use, the top, bottom and side edges of the shaft 10 are in close proximity to the interior surfaces of the heat cavity 156.

Use of the tool of the embodiment of FIGS. 13–15 can be best understood with reference to FIG. 13. First, the top section 80 is removed from the bottom 78 as depicted by Arrow A in FIG. 13. A hockey stick shaft is then placed in the U-shaped heat plate 86 so that the heat panel portions 90–92 contact corresponding bottom and side surfaces of the end 12. As seen in FIG. 13, the top portion of the base 88 extends above end 12. The top 88 is then placed back on the bottom 78 as shown in phantom in FIG. 13. The plate shims 152 and 154 extend outwardly from the bottom of the top portion 138 of the cover 136 so that the peripheral edges of the heat plate 134 contact the heat plate support portions 94, 95 creating a heat cavity 156. The plug 13 is then inserted into an electrical outlet to activate the thermistors 122. This heats plate 86 and heat is transferred to plate 134 along the peripheral edges of the plate 134 where it is in contact with plate support portions 94, 95. The plate 134 is not in direct contact with a heating unit 121, but derives heat from plate 86. Heating of plates 86 and 134, causes softening or melting of the hot melt adhesive at the blade replacement end of the stick. When such adhesive is sufficiently melted, the replacement blade 16 can be removed from or inserted into the open end 14 of the stick.

Although a variety of heat plates 84 and 134 and bus bars 126 can be utilized, the heat plates 84 and 134 and bus bars 126 utilized in the embodiment of FIGS. 13–15 are constructed of 20 gauge, nickel plated copper. The thermistors or self-limiting heaters 122 are set to maintain temperature control at approximately 334° F.±45° F. (168° C.±7° C.) and are available in the art. The thermally conductive, electrically insulative element 124 is made of thermally conductive silicon/fiberglass manufactured by Arlon as P2733X012. The element 124 is uncured and can therefore be used as its own adhesive to secure the bus bars 126 by curing it at 300 degrees F for 15 minutes. The thermistors 122 are glued to the bus bars 126 with a conductive adhesive sold by Creative Materials, Inc.

Although the description of the preferred embodiment has been quite specific, it is contemplated that various modifications could be made without deviating from the spirit of the present invention. Accordingly, it is intended that the scope of the present invention be dictated by the appended claims rather than by the description of the preferred embodiment.

I claim:

1. A method of applying a replacement blade to or removing a replacement blade from the blade receiving end of a hockey stick shaft, said hockey stick shaft having top, bottom and side edges defining an outer shaft configuration and outer shaft dimensions and a hollow blade receiving end, with an inner shaft configuration and inner shaft dimensions, said replacement blade having a connecting end for insertion into said hollow receiving end, said connection end having an outer blade configuration and outer blade dimensions approximating, or slightly smaller than, said inner shaft, dimensions, either said blade receiving end or said connecting end being coated with a heat sensitive adhesive, said method comprising the steps of:

providing a blade application/removal tool comprising a rigid U-shaped heat plate of a heat conductive material having an inner cavity substantially conforming to said outer shaft configuration and with dimensions slightly greater than said outer shaft dimensions and an open top, a selectively removable top heat plate having dimensions sufficiently large to span said open top, a heating element connected with said U-shaped heat plate and an outer housing;

placing said hollow blade receiving end into said inner cavity and placing said top heat plate over said open top so that said top heat plate spans said open end;

heating said hollow blade receiving end with said tool;

inserting said connecting end into said hollow blade receiving end or removing said connecting end from said hollow blade receiving end; and removing said top heat plate and removing said hollow blade receiving end from said inner cavity.

2. The method as defined by claim 1 wherein said heat element includes a thermostat.

3. The method as defined by claim 2 wherein said thermostat maintains the temperature of said U-shaped heat plate within a range of about 250° F. to 340° F.

4. The method as defined by claim 1 wherein said heat element includes an electrical self-limiting heater.

5. The method as defined by claim 4 wherein said self-limiting heater maintains the temperature of said U-shaped heat plate within a range of about 289° F. to 379° F.

6. The method of claim 1 wherein said U-shaped heat plate includes a pair of parallel side plates, each having an outer edge defining said open top.

7. The method of claim 6 including a support portion integrally joined with and extending outwardly from each of said side plates at right angles thereto.

8. The method of claim 7 wherein the step of placing said top plate over said open top includes placing said top plate over said open top so that said top plate engages said support portions.

9. The method of claim 1 wherein said housing is spaced outwardly from said U-shaped heat plate.

10. The method of claim 9 including an insulation layer positioned between said U-shaped heat plate and said outer housing.

11. The method of claim 8 wherein said side plates function to transfer heat to said top plate when said top plate engages said support portions.

12. The method of claim 1, wherein said outer housing is constructed of plastic.

13. The method of claim 1, including a top plate housing connected with said top heat plate.

14. The method of claim 13 wherein said top plate housing is constructed of plastic.

15. The method of claim 1 including a tether connecting said removable top heat plate with said outer housing.

* * * * *